United States Patent [19]
Kanazawa et al.

[11] Patent Number: 4,678,971
[45] Date of Patent: Jul. 7, 1987

[54] LINEAR MOTOR AND CONTROL METHOD THEREOF

[75] Inventors: Hiroshi Kanazawa, Hitachi; Seizi Yamashita, Katsuta; Kunio Miyashita, Hitachi, all of Japan

[73] Assignee: Hitachi, Ltd., Tokyo, Japan

[21] Appl. No.: 817,623

[22] Filed: Jan. 10, 1986

[30] Foreign Application Priority Data

Jan. 14, 1985 [JP] Japan .................................. 60-3370
Jan. 14, 1985 [JP] Japan .................................. 60-3371
Jan. 14, 1985 [JP] Japan .................................. 60-3372

[51] Int. Cl.$^4$ ........................................... H02K 41/00
[52] U.S. Cl. ..................................... 318/135; 310/12
[58] Field of Search ................................. 310/12-14; 318/135

[56] References Cited

U.S. PATENT DOCUMENTS 3,904,941  9/1978  Matsui .................................. 310/124

OTHER PUBLICATIONS

IBM Tech Disclosure Bulletin, "Linear Incremental Motor", Thompson, vol. 6, No. 9, 2/64, pp. 19 & 20.

*Primary Examiner*—Donovan F. Duggan
*Attorney, Agent, or Firm*—Antonelli, Terry & Wands

[57] ABSTRACT

A linear motor comprises a first magnetic pole having a plurality of uneven magnetic pole teeth of magnetic material arranged longitudinally at predetermined regular intervals of length, and a second magnetic pole having a yoke and plurality of uneven magnetic pole teeth made of magnetic material opposed to the first magnetic pole with a slight gap and a coil wound on each magnetic pole tooth and the permanent magnets, in which the relative position of the first and second magnetic poles in the longitudinal direction can be varied. The longitudinal lengths of the protruded portion of the second magnetic pole are substantially equal with each other. The longitudinal length of the recessed portion of the second magnetic pole is set to about one-third of the longitudinal length of the protruded portion of the first magnetic pole. The number of the protruded portions of the first magnetic pole is set to be a multiple of two.

11 Claims, 25 Drawing Figures

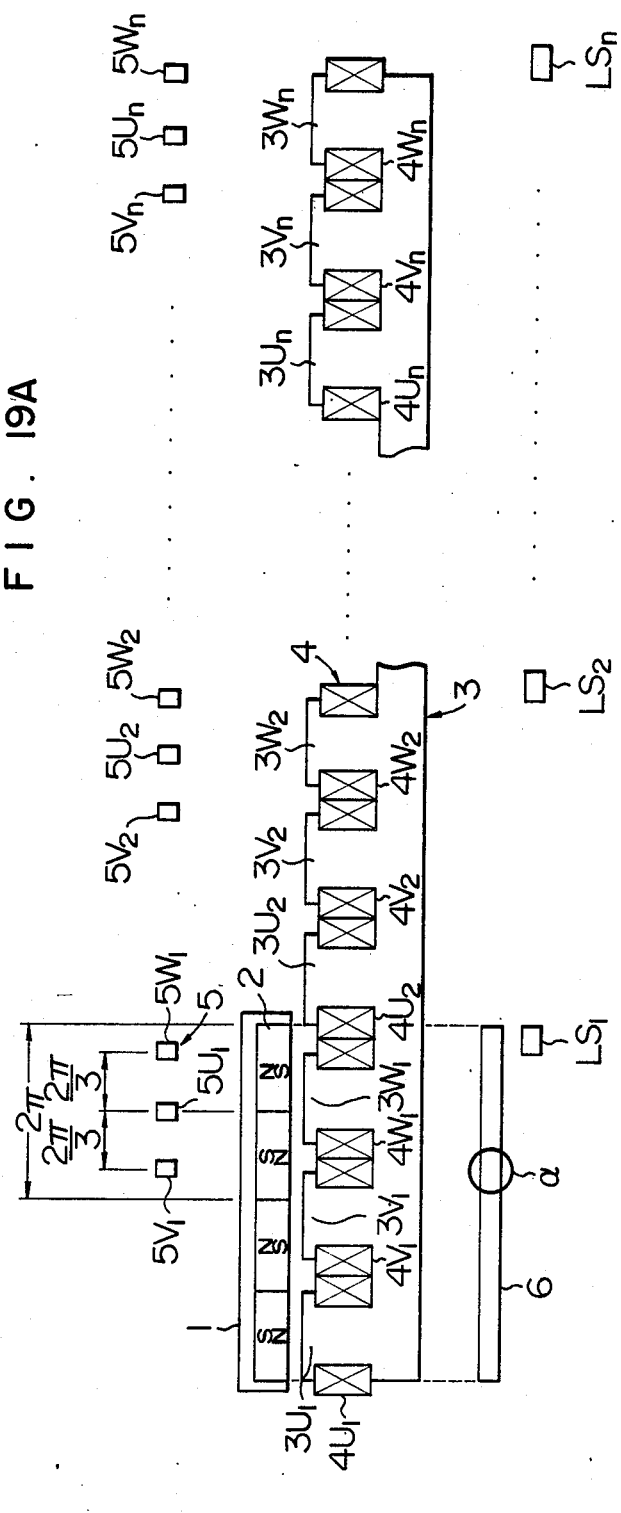
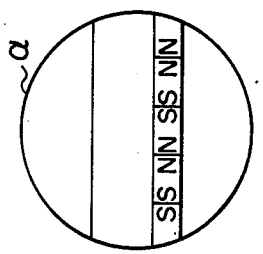
FIG. 19A
FIG. 19B

LINEAR MOTOR AND CONTROL METHOD THEREOF

BACKGROUND OF THE INVENTION

1. Field of the Invention

The present invention relates to a linear motor, or more in particular, to a linear motor in which the ratio of teeth between the rotor and stator is fixed thereby to reduce the thrust pulsation for driving the rotor, thus making proper operation possible.

2. Description of the Prior Art

Conventional rotary-type motors, for example, have teeth of the magnetic poles thereof constructed as disclosed in the specification of French Pat. No. 1452379. In such a construction, the protrusions and the recesses of the stator are arranged equidistantly, and each protrusion of the rotor teeth has the same length as the stator protrusion while the rotor recess is one half of the protrusion thereof in length. For moving the rotor, therefore, at least four rotor teeth (protrusions) are required.

With an increase in the number of teeth, the frequency increases twice for the motors having the protrusions of the same pitch, resulting in an increased switching loss for control and increased noises.

In the presence of a thrust pulsation of this type of linear motor having teeth in the stator and rotor, the controllability is greatly deteriorated for achieving a predetermined speed or positioning as well as for speed control.

The thrust generated in the motor is determined by an induced voltage and the pattern and phase of the current supplied. The current pattern supplied has so far not been developed. In the linear induction motors, for example, the source voltage is applied directly, and there has been no cases describing the patterns of the current supplied.

On the other hand, a linear motor having a position detecting device is disclosed in Japanese Patent Unexamined Publication No. 166874/82. This linear motor comprises a rotary pulse generator mounted on the rotor thereof in order to detect the position of the rotor or the speed thereof. As a result, the wiring from the rotor is connected to a control circuit, thus giving no consideration to the movement over a long distance. In the encoder of contact type, by contrast, any attention is not paid to the high-speed movement either.

SUMMARY OF THE INVENTION

Accordingly, a first object of the present invention is to provide a linear motor in which the movement of the rotor on the stator is capable of being controlled smoothly.

A second object of the present invention is to provide a method of controlling a linear motor in which a uniform thrust is obtainable regardless of the position of the rotor of the linear motor, and the thrust pulsation is reduced while the motor is running.

A third object of the present invention is to provide a method of detecting the position of the linear motor which is applicable to the movement over a long distance, high-speed running and highly accurate position detection.

According to one aspect of the present invention, there is provided a linear motor comprising a first magnetic pole having a plurality of uneven magnetic pole teeth of magnetic material arranged longitudinally at predetermined regular intervals of length, and a second magnetic pole having a yoke and a plurality of uneven magnetic pole teeth made of magnetic material opposed to the first magnetic pole with a slight gap and coils wound on the magnetic pole teeth and permanent magnets, in which the relative position of the first and the second magnetic poles in the longitudinal direction can be varied. The longitudinal lengths of the protruded and recessed portions of the first magnetic poles and the protruded portion of the second magnetic poles are substantially equal with each other. The longitudinal length of the recessed portion of the second magnetic pole is set to about one-third of the longitudinal length of the protruded portions of the first magnetic pole. The number of the protruded portions of the first magnetic pole is set to be a multiple of two.

According to a second aspect of the present invention, there is provided a method of controlling a linear motor comprising a first magnetic pole having a plurality of uneven magnetic pole teeth of magnetic material arranged longitudinally at predetermined regular intervals of length, and a second magnetic pole of magnetic material arranged opposedly with a slight gap from the first magnetic pole and having a plurality of uneven magnetic pole teeth, in which the magnetic pole teeth making up the protrusions of the opposed parts of the first and second magnetic poles are in the ratio of two to three or a multiple thereof in number, and the pattern of the current supplied is determined by the waveform of a voltage induced in the first or second magnetic pole when they are driven.

Further, taking into consideration the fact that the thrust generated by the linear motor is dependent on the magnitude and phase of the induced voltage and the supplied current, the pattern of the supplied current is controlled and determined from the waveform of the induced voltage. According to a third aspect of the present invention, the linear motor includes a plurality of position sensors, a plurality of magnetic pole position detectors, a magnetic pole position distributor, and a position sensor signal switch. The position sensors and the magnetic pole position detectors are divided and arranged in the longitudinal direction of the stator side to detect the position of a rotor, and are sequentially operated by means of the movement of the rotor. The position sensor signals are sequentially selected by means of the signals from the magnetic pole position detectors which are operating. Further, a position correcting circuit is mounted in the position sensor signal switch so as to prevent the division of the position signal pulse generated by the mounting accuracy of the position sensor.

Further, in switching the position sensors, the phase of the signal switched is synchronized by shaping the waveform thereof on the basis of the value of the analog output of the position sensor switched from the leading and trailing edges of the position sensor.

BRIEF DESCRIPTION OF THE DRAWINGS

FIG. 19(A) is a side view schematically showing the side of a linear motor parallel to the running direction thereof according to an embodiment of the present invention.

FIG. 19(B) is an enlarged view of the part designated by α of FIG. 19(A).

DESCRIPTION OF THE PREFERRED EMBODIMENTS

An embodiment of the linear motor according to an embodiment of the present invention will be explained below with reference to the accompanying drawings.

A three-phase linear motor is used in this embodiment.

Figure 1:
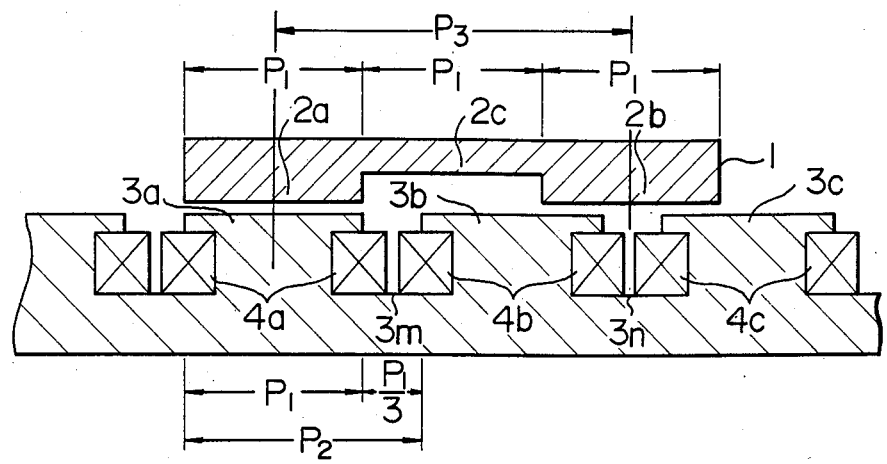
FIG. 1 is a sectional view schematically showing the side of a linear motor parallel to the running direction thereof according to an embodiment of the present invention.
Figure 2:
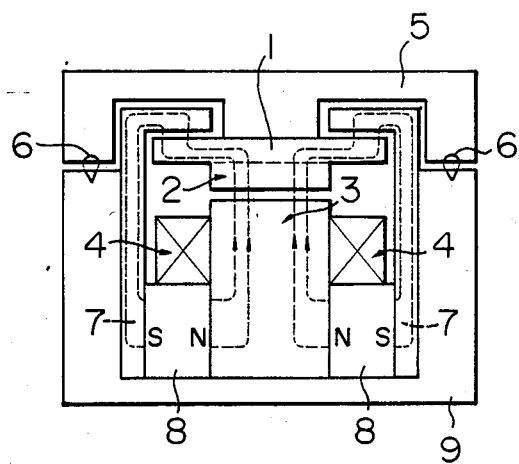
FIG. 2 is a front view of the side thereof perpendicular to the running direction thereof.

First, in FIG. 1 and FIG. 2, reference numeral 1 designates a rotor yoke, numeral 2 a rotor, numerals 2a to 2c magnetic pole teeth, numeral 3 a stator, numerals 3a to 3c, 3m and 3n stator teeth, numeral 4 a coil assembly, numerals 4a to 4c coils, numeral 5 a truck, numeral 6 a wheel, numeral 7 a yoke, numeral 8 a magnet, and numeral 9 a base.

Specifically, the rotor 2 has a plurality of protruded magnetic teeth 2a, 2b and recessed magnetic teeth 2c of magnetic material at predetermined regular intervals of length along the longitudinal direction on the rotor yoke 1. The pitch between the protruded magnetic teeth is shown by $P_3$ which is an electrical angle of 360°.

With a very small gap with the magnetic pole teeth 2a, 2b mentioned above, a plurality of magnetic pole teeth of magnetic material including protruded stator teeth 3a to 3c, and recessed stator teeth 3m, 3n of the stator 3 are oppositely arranged thereto. Each of the stator teeth 3a to 3c has the length of $P_1$ as shown.

In the shown embodiment, the length $2P_1$ represents an electrical angle of 360°.

The coils 4a, 4b, and 4c of the coil assembly 4 are wound on the stator teeth 3a, 3b, and 3c respectively. The stator teeth 3m, 3n are arranged along the length of about $P_1/3$ between the stator teeth 3a and 3b and between 3b and 3c. The coils 4a, 4b, and 4c are connected with each other in Y-connection.

The rotor 2 makes up a first magnetic pole and the stator 3 a second magnetic pole.

Magnets 8 are arranged with the poles thereof of the same polarity opposed to each other with the teeth of the stator 3 on the side ends of the stator teeth 3a to 3c. The side of the magnets 8 of the other polarity is mounted on the yoke 7.

The truck 5 has mounted thereon the rotor yoke 1 and the rotor 2 with the magnetic pole teeth 2a, 2b, 2c, and is spatially supported through the wheel 6 between the stator 3 and the yoke 7, the truck 5 being contacted only with the wheel 6. The wheel 6, on the other hand, is adapted to roll or slide on the base 9.

This configuration enables the magnetic fluxes of the magnets 8 to pass through a magnetic path shown by a dashed line in FIG. 2.

The operation of the system configured as above will be explained below with reference to FIGS. 3 to 7.

Figure 3:
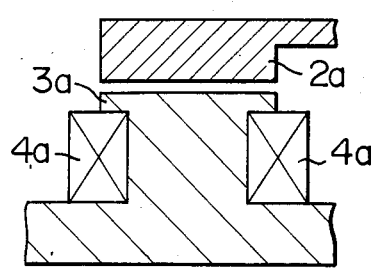
FIGS. 3 and 4 are sectional views schematically showing the sides parallel to the running direction thereof similar to the foregoing drawings.
Figure 4:
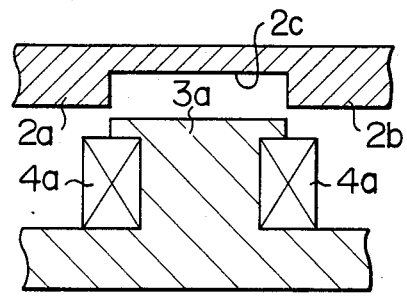

FIG. 3 shows the magnetic pole tooth 2a and the stator tooth 3a laid one over the other, representing the case in which the magnetic reluctance shown by the dashed line in FIG. 2 is minimum. FIG. 4 shows the case in which the magnetic poles are positioned at the position of maximum magnetic reluctance, and the stator tooth 3a is located between the magnetic pole teeth 2a and 2b. Namely, the magnetic pole tooth 2c and the stator tooth 3a are overlapped with each other.

As described above, since the magnetic reluctance of the magnetic circuit is changed by moving the magnetic pole teeth 2a and 2b arranged on the rotor yoke 1 along the stator tooth 3a, the magnetic fluxes 10a passing through the stator 3a is changed in the manner shown in FIG. 5(A).

With the change in the magnetic fluxes 10a, an induced voltage 11a is generated in the coil 4a.

The thrust of the motor is determined by the product of the induced voltage 11a and the current supplied upon energization of the coil 4a. Such a thrust is produced in positive direction when the current 12a is supplied in the same form and same phase as the waveform of the induced voltage 11a. The thrust in the opposite direction is produced, by contrast, when the phase is opposite.

Numeral 13a in FIG. 5(B) represents a curve of the thrust line (the thrust curve generated in a phase) caused in the former case where the phase is the same.

Figure 6:
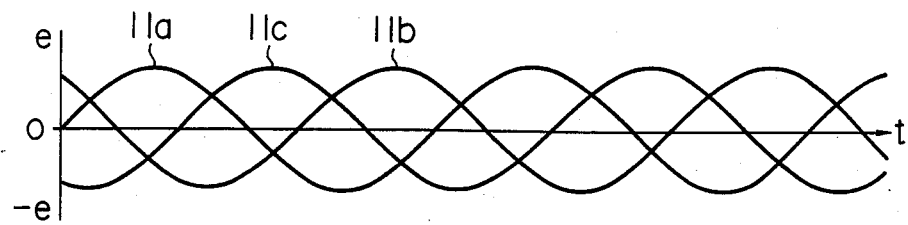
FIG. 6 is a graph showing the curve of the induced voltage generated in the three-phase coil.
Figure 7:
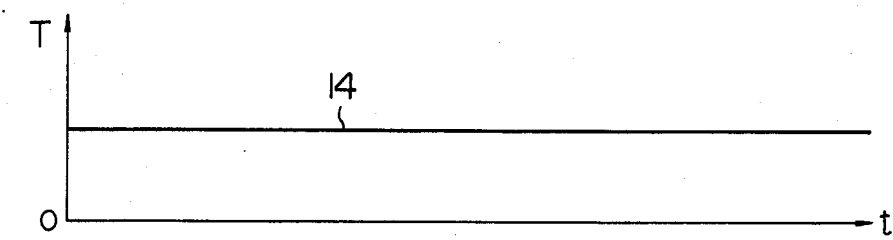
FIG. 7 is a diagram showing the thrust generated in the motor.

The thrust line 13a is generated in the coil 4a as shown in FIG. 3 and 4, while the induced voltages 11a, 11b, 11c are generated as shown in FIG. 6 in the coils 4b, 4c arranged $P_1 + 1/3P_1$ displaced in FIG. 1, or at points displaced by 240° electrical angle respectively. If the current of the same phase with respect to the induced voltage is supplied to the coil by detecting the position of the magnetic pole teeth and stator teeth in each phase of the three induced voltages 11a to 11c, a fixed thrust line 14 as shown in FIG. 7 can be obtained.

According to the embodiment under consideration, as explained above with reference to FIG. 1, two magnetic pole teeth including 2a and 2b relating to the protruded poles of the protruded parts opposed between the rotor 2 and the stator 3, and three stator teeth including 3a to 3c are involved. That is to say, the magnetic pole teeth arranged on the rotor yoke 1 are two.

As a result, an induced voltage having three phases of $2\pi/3$ is capable of being generated thereby to produce a thrust with low ripples on the one hand, and a uniform thrust is produced at any place for an improved controllability.

Figure 8:
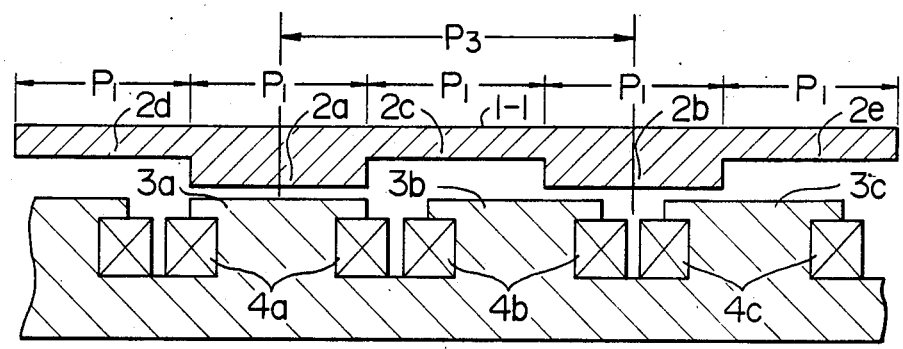
FIG. 8 is a sectional view schematically showing the side of the linear motor parallel to the running direction thereof according to another embodiment of the present invention.

Now, a sectional view schematically showing the side of a linear motor parallel to the running direction thereof according to another embodiment is shown in FIG. 8.

In FIG. 8, the same reference numerals as those in FIG. 1 designate the same component elements as in FIG. 1 respectively. Numerals 2d, 2e designate magnetic pole teeth relating to the recessed parts, and numeral 1-1 the rotor yoke.

Specifically, in the same diagram, the magnetic pole teeth 2d, 2e and as long as P₁ are arranged on the right and left on the rotor yoke 1 shown in FIG. 1, making up the rotor yoke 1-1.

Since the magnetic pole teeth thus arranged do not substantially affect the changes in magnetic fluxes, almost the same waveform of an induced voltage is obtained as in FIG. 6 even when the rotor yoke 1-1 shown is moved, thus producing substantially the same characteristics as the linear motor shown in FIG. 1.

In contrast with the embodiments mentioned above, if the number of the magnetic pole teeth 2a, 2b, 2c protruded on the rotor yoke 1A is a multiple of three instead of two, the magnetic pole teeth 2a and 2m would be overload on the stators 3a and 3d of the same phase.

Now, assume that the stator tooth 3a is U phase, 3b the V phase, and 3c the W phase. The stator tooth 3d is U phase, the stator tooth 3e the V phase, and the stator tooth 3f the W phase. In the case where of FIG. 9 where the coils 4a and 4d corresponding to U phase cross the magnetic fluxes, a voltage about twice as large is induced in the phases of the coils 4a, 4d of the stator teeth 3a, 3d overlaid with the magnetic pole teeth 2a, 2m as shown in FIG. 11.

Figure 11:
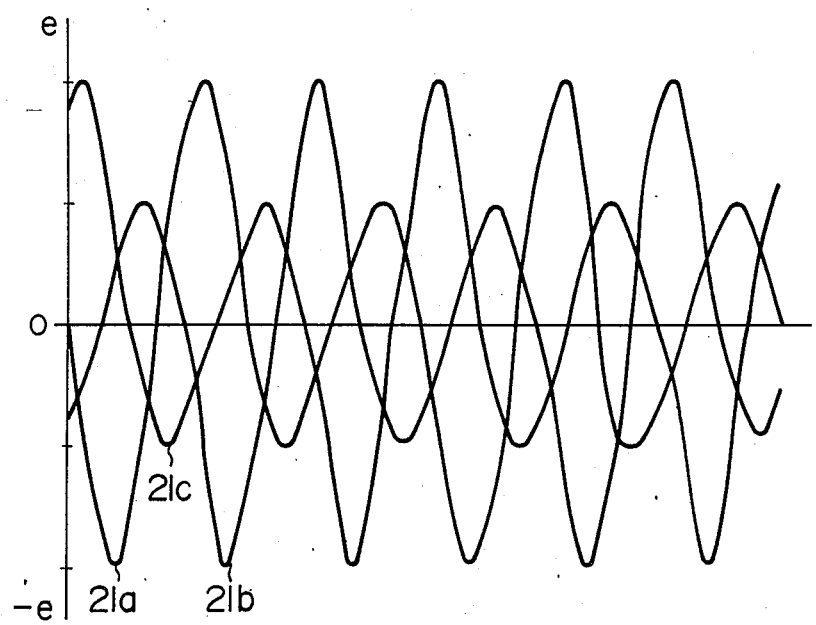
FIG. 11 is a graph showing curves for explaining the voltage induced in the three-phase coil.

In this way, in the case of a rotor having three magnetic pole teeth relating to protruded poles, the induced voltages 21a to 21c shown in FIG. 11 generated in the coils of respective phases represent a fixed magnitude, but undergo a change, and the resultant phase displacement greatly deteriorates the controllability.

Figure 9:
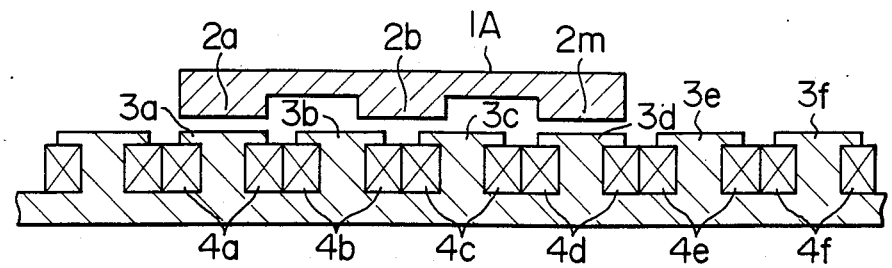
FIG. 9 is a sectional view schematically showing the side of a comparable linear motor parallel to the running direction thereof.

As explained above, if the number of the magnetic pole teeth providing protrusions is three as shown in FIG. 9, therefore, it is impossible to obtain a motor of high controllability.

Figure 10:
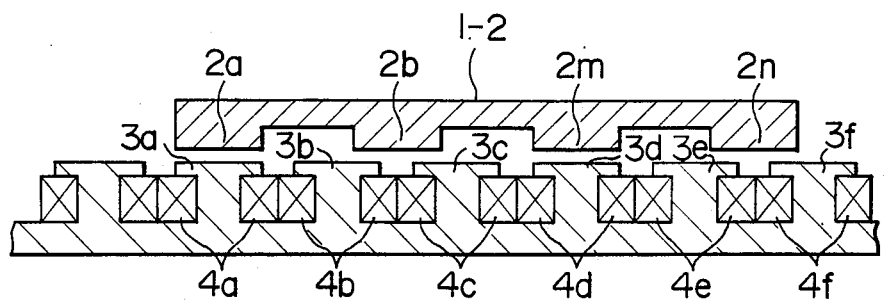
FIG. 10 is a sectional view schematically showing the side of a linear motor parallel to the running direction thereof according to a further embodiment of the present invention.

FIG. 10 is a sectional view schematically showing the side of a linear motor parallel to the running direction thereof according to a further embodiment of the invention.

In FIG. 10, the same reference numerals as in FIG. 1 denote the identical component parts to those in FIG. 1. Numerals 2m, 2n designate protruded magnetic pole teeth, 3d to 3f protruded stator teeth, numerals 4d to 4f coils, and numeral 1-2 a rotor yoke.

Specifically, in the embodiment under consideration, the number of the magnetic pole teeth is twice 2.

In the case of the present embodiment, two rotor yokes 1 as shown in FIG. 1 are connected in series with each other through a recessed portion. The induced voltage takes the form shown in FIG. 6. There is no magnetic saturation of the rotor yoke 1-2, magnetic pole teeth 2a, 2b, 2m, 2n, the stator teeth 3a to 3f and the part equivalent to the yoke 7 in FIG. 1 making up the magnetic circuit, the magnetic of an induced voltage is about twice as large as that of the induced voltage as shown in FIG. 6.

As explained above, predetermined magnitude induced voltages of three phases displaced with $2\pi/3$ can be obtained by making the number of the rotor magnetic teeth to be a multiple of 2 (2, 4, 8, ... ), and the fixed thrust line 14 shown in FIG. 7 can be obtained.

Figure 5:
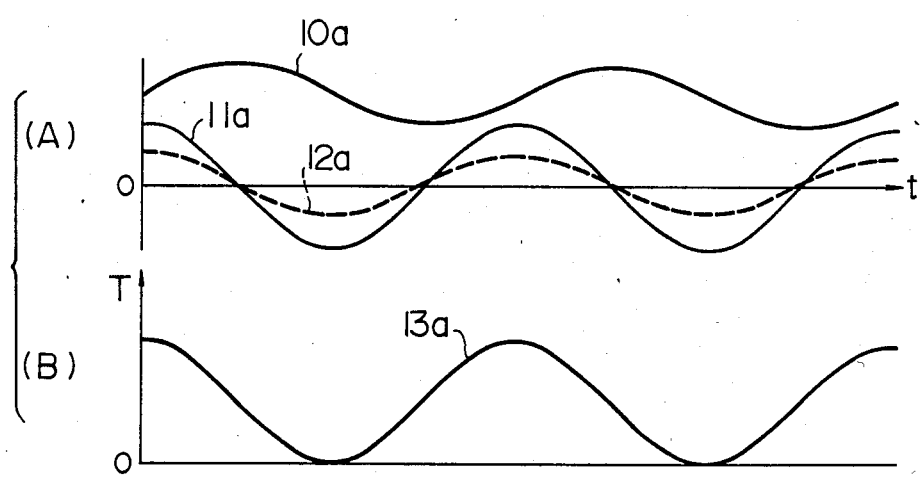
FIGS. 5(A) and 5(B) are graphs showing the curves of magnetic fluxes, induced voltage and thrust thereof.

The induced voltage was illustrated in the form of sinusoidal wave in FIG. 5. This may be replaced by a trapezoidal or stepped form depending on the size of the gap between the rotor and stator and the widths of the magnetic pole teeth or the like, in which case it is also possible to obtain a fixed thrust line.

In the embodiments explained above, the first magnetic pole was used as a rotor, and the second magnetic pole as a stator. Instead, the first magnetic pole may be used as a stator and the second magnetic pole as a rotor with the equal effect.

In FIG. 1, the phases of adjacent coils are arranged to conform to the equation shown below.

$$\sin \frac{\pi}{m} = \left| \sin \left( \frac{P_2}{P_3} \right) \times 2\pi \right| \quad (1)$$

In equation (1) above, m is the number of phases of the motor. In the case of three phases, for instance, $P_2$ may be $4/3 P_1$.

Figure 12:
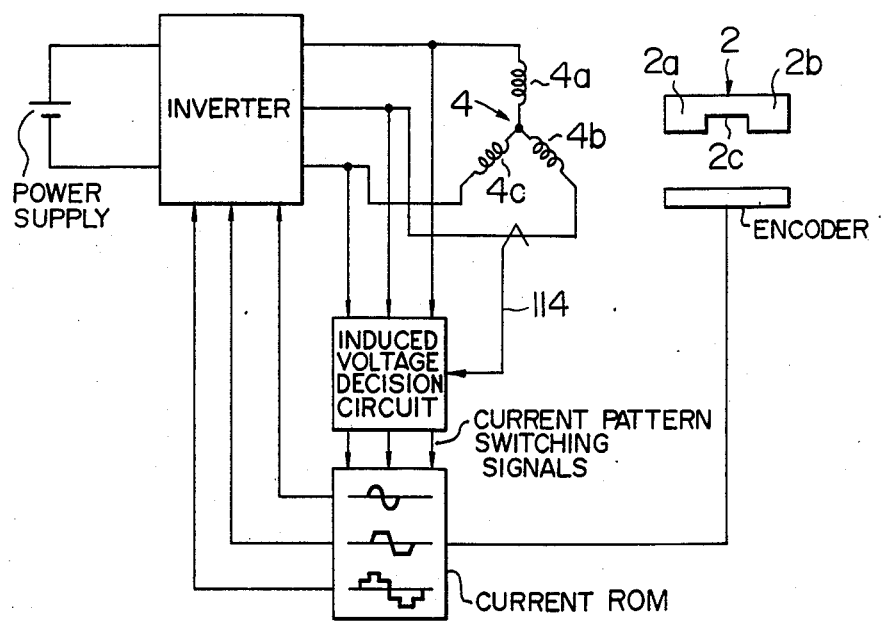
FIG. 12 is a diagram showing a general configuration of a control circuit used in the control method according to the present invention.

FIG. 12 shows a control circuit relating to the configuration described above for achieving the second object of the invention.

Specifically, the coils 4a to 4c of the coil assembly 4 are connected to an inverter. The voltage induced in the coils are applied to an induced voltage decision circuit and the current flowing through the coils is applied to the induced voltage decision circuit through the current detector 114. A current pattern switching signal produced from this circuit is applied to a current ROM relating to a selective current pattern supply circuit, and then to the inverter in accordance with the result of the operation thereof.

The above-mentioned current ROM is impressed with an output from the encoder relating to the position detector facing the rotor 2. The sine, trapezoidal, and stepped waveforms are previously stored in the current ROM. Namely, the signals from the encoder are pulses which are proportional to the moved distance of the rotor, and update the address of the current ROM, so that the current flows in the coil responsive to the magnetic pole position of the rotor.

The control operation of the circuit having the above-mentioned configuration will be explained with reference to FIGS. 12 to 18.

FIG. 3 shows the case in which the magnetic pole tooth 2a and the stator tooth 3a are overlaid one on another and the magnetic reluctance of the magnetic circuit shown by the dashed line in FIG. 2 is minimum, and FIG. 4 the case in which a stator tooth 3a is located between the magnetic pole teeth 2a and 2b at the position of the magnetic poles associated with the maximum magnetic reluctance of the magnetic circuit.

Figure 13:
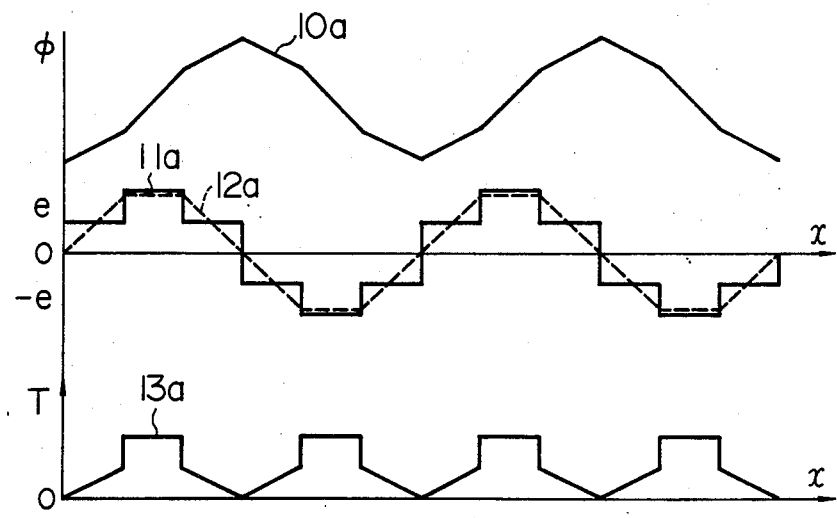
FIG. 13 is a graph showing curves of magnetic fluxes, induced voltage and thrust generated therein.

As explained above, while the magnetic pole teeth 2a, 2b arranged on the rotor yoke 1 move on the stator tooth 3a, the magnetic fluxes 10a change in the manner shown in FIG. 13, thereby generating an induced voltage 11a in the coil 4a.

The thrust of the motor is determined by the product of the induced voltage 11a and the current supplied to the coil 4a.

In the case of FIG. 13, the induced voltage 11a takes a stepped protruded form. By the control circuit shown in FIG. 12, therefore, the current thus supplied is rendered like a supplied current 12a to reduce the phase difference to zero, thereby supplying a trapezoidal form of current, with the result that a positive trapezoidal waveform of thrust can be obtained. Also, the opposite thrust may be produced if the current of the opposite phase is supplied.

Numeral 13a in FIG. 13 designates a thrust curve generated in one coil when the phase difference is zero.

Figure 14:
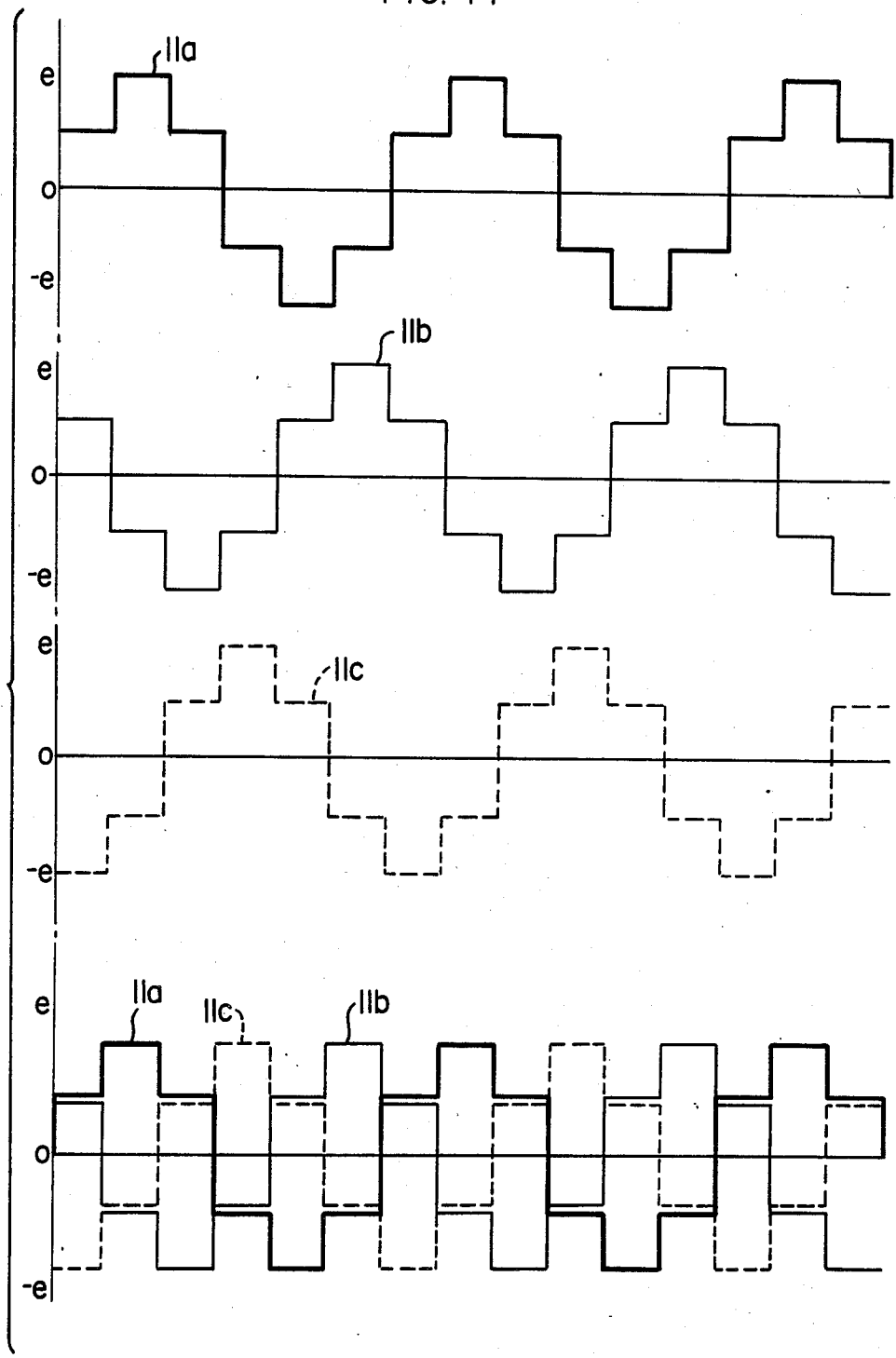
FIG. 14 shows waveforms of voltages induced in the three-phase coil.

This thrust curve 13a is generated in the coil 4a shown in FIGS. 3 and 4, while the induced voltages 11a, 11b, 11c shown in FIG. 14 are generated in the coils 4b, 4c arranged displaced by $P_1 + 1/3\ P_1$ in FIG. 1, that is, by 240 degree of electrical angle.

Figure 15:
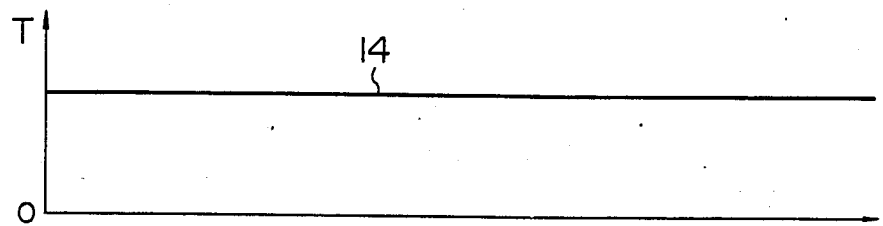
FIG. 15 is a diagram showing the thrust generated in the three-phase coil.

If the phases of the three induced voltages 11a to 11c are supplied with a trapezoidal current of the same phase by detecting the positions of the magnetic pole teeth 2a, 2b and the stator teeth 3a to 3c, a thrust curve 14 with small ripples shown in FIG. 15 is obtained.

According to this embodiment, as explained with reference to FIG. 1, rotor yoke 1 is two. The number of the magnetic pole teeth arranged on the rotor yoke 1 may be two or a multiple of two.

According to this embodiment, a three-phase induced voltage having a phase difference of $2\pi/3$ is supplied with a trapezoidal current of the same phase, thereby producing a thrust with small ripples on the one hand, and almost uniform thrust is obtained regardless of the place it is used, thereby producing a control effect for a motor high in controllability and low thrust ripples.

The foregoing description concerns a waveform of the induced voltage of the motor having stepped protrusions and the supplied current having a trapezoidal waveform. In the opposite case where the induced voltage has a trapezoidal waveform and the supplied current stepped protrusions, a similar effect is obtained.

Figure 16:
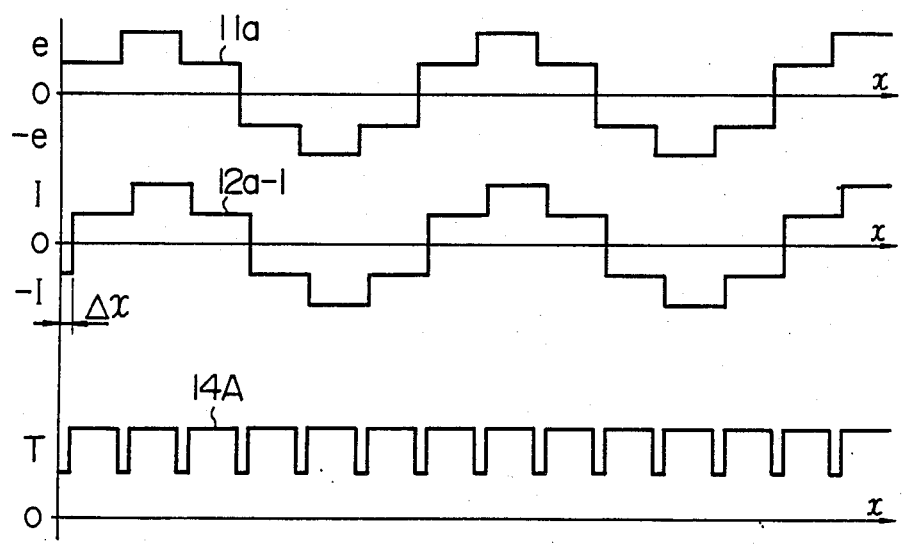
FIG. 16 to FIG. 18 are graphs showing the thrust curves in the case where the phase difference is Δx against the induced voltage.

The embodiments above wave explained with reference to the case in which the phase difference is zero between the induced voltage generated in the coils and the supplied current. In an actual control operation in combination with a control circuit, however, the delay time of the control circuit or the displacement of the position detector make it difficult to effect energization ideally with zero phase difference. Also, in the case of the stepped induced voltage, if the current 12a-1 of the same waveform as the induced voltage 11a is supplied with the phase difference $\Delta x$ as shown in FIG. 16, the thrust generated in the three-phase coils is indicated by the thrust curve 14A. As seen from this curve, a sag of thrust occurs by the width of the phase difference $\Delta x$, thereby deteriorating the controllability.

Figure 18:
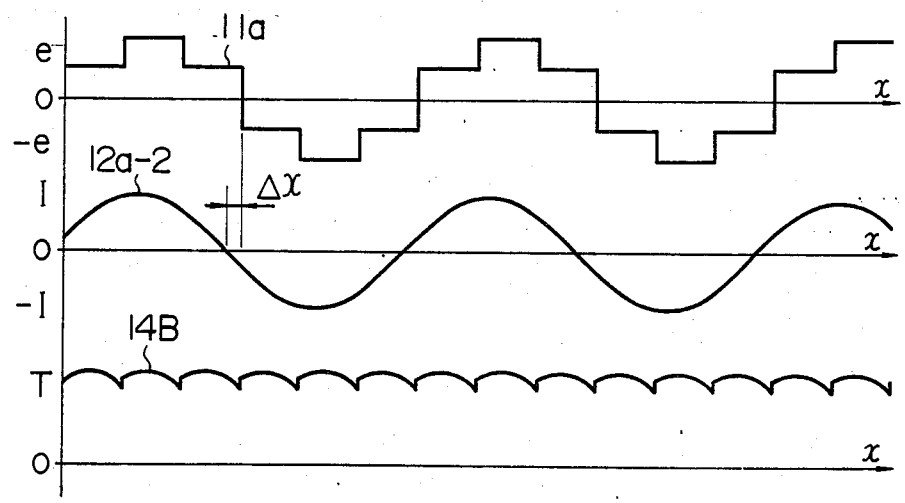

FIG. 18 shows the case in which the induced voltage of stepped waveform is supplied with a sinusoidal current 12a-2. When the phase difference $\Delta x$ occurs, the thrust as shown by the thrust curve 14B is generated in the three-phase coil, thus causing a pulsation in thrust during the section of the phase difference $\Delta x$. Further, in the case where the induced voltage of this stepped waveform is supplied with a sinusoidal current zero in phase difference, the thrust curve obtained is not linear either, resulting in an inferior controllability.

Figure 17:
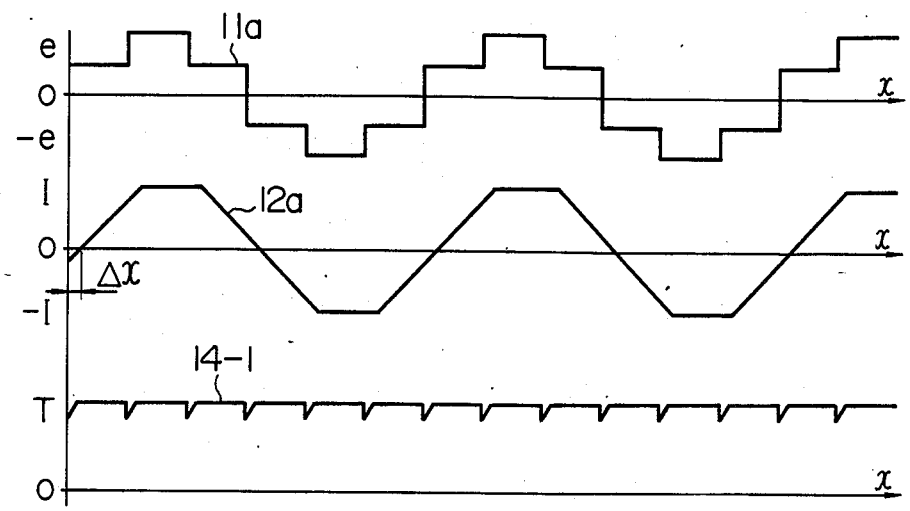

FIG. 17, on the other hand, shows the case in which the induced voltage 11a of stepped waveform is supplied with a trapezoidal current 12a with the phase difference $\Delta x$.

In this case, the thrust curve is indicated by 14-1, indicating that of all the cases of the supplied current including those of an induced voltage of sinusoidal wave and the supplied current of other waveforms, the thrust output is obtained with the least thrust pulsation.

In summary, if the phase difference is zero between the stepwise protruded induced voltage and the current of the same waveform supplied with such an induced voltage, the thrust is represented by a predetermined linear curve, while if there is any phase difference between them, the thrust pulsation becomes considerable.

Also, when a sinusoidal wave is used as a supplied current, the thrust pulsation deteriorates the controllability even when there is no phase difference.

In contrast, as explained with reference to FIG. 17, according to the present invention, thrust is subjected to less variations even when there is a phase difference with the supplied current, and the thrust curve is linear also when the phase difference is zero, thereby leading to the best controllability.

It will be understood from the foregoing description that a substantially uniform thrust output is obtained at all positions if a current of stepped waveform is supplied with an induced voltage of trapezoidal form, and a current of trapezoidal form with an induced voltage of stepped form generated in the coils.

In the above-described embodiments, the first magnetic pole was used as a rotor, and the second magnetic pole as a stator. As an alternative, the first magnetic pole may be used as a stator, and the second magnetic pole as a rotor.

Now, explanation will be made about the method of position detection of a linear motor to achieve the third object of the invention will reference to FIGS. 19A to 23.

A general configuration is shown in FIG. 19A. A stator system comprises n sets of teeth $3U_1, 3V_1, 3W_1$ to $3U_n, 3V_n, 3W_n$, coils $4U_1, 4V_1, 4W_1$ to $4U_n, 4V_n, 4W_n$, magnetic pole position detectors $5U_1, 5V_1, 5W_1$ to $5U_n, 5V_n, 5W_n$, and linear encoders $LS_1$ to $LS_n$ with each set including three phases (n being an integer not smaller than unity). Numerals 3, 4, 5 in the drawing a general designation of the teeth, coils and the magnetic pole position detector respectively.

The linear encoder sensors $LS_1, LS_2$ correspond to the position sensors including the encoders for detecting the position of the rotor 1. The magnetic pole position detectors $5U_1$ to $5W_1$, $5U_2$ to $5W_2$, on the other hand, double as a switch for the sensors at the same time.

The rotor 1 is supported by a support mechanism in such a manner as to maintain a predetermined size of gap in parallel with the teeth 3, and is freely movable. At the same time, the rotor 1 has arranged therewith a magnet 2, and a linear encoder magnetizer 6 is arranged in a place free of the effect of the leakage magnetic fluxes of the magnet 2.

This linear encoder magnetizer 6 is arranged also opposedly with a predetermined gap to the linear encoder sensors $LS_1$ to $LS_n$, so that all the detection elements of the magnetic pole detectors 5 are held with a pedetermined gap in parallel to the magnet 2.

Explanation will be made of the case where n=1. The magnet 2 mounted on the rotor 1 has N and S poles thereof arranged at pitches of $\pi$ alternately, and are magnetized vertically upward of the teeth $3U_1$, $3V_1$, $3W_1$ and the rotor 1. The magnetic pole position detectors $5V_1$, $5U_1$, $5W_1$, on the other hand, are arranged at pitches of $2\pi/3$ at the positions shown in the drawings.

The teeth $3U_1$ to $3W_n$ are arranged at pitches of $4\pi/3$ with the width of $\pi$.

Figure 20:
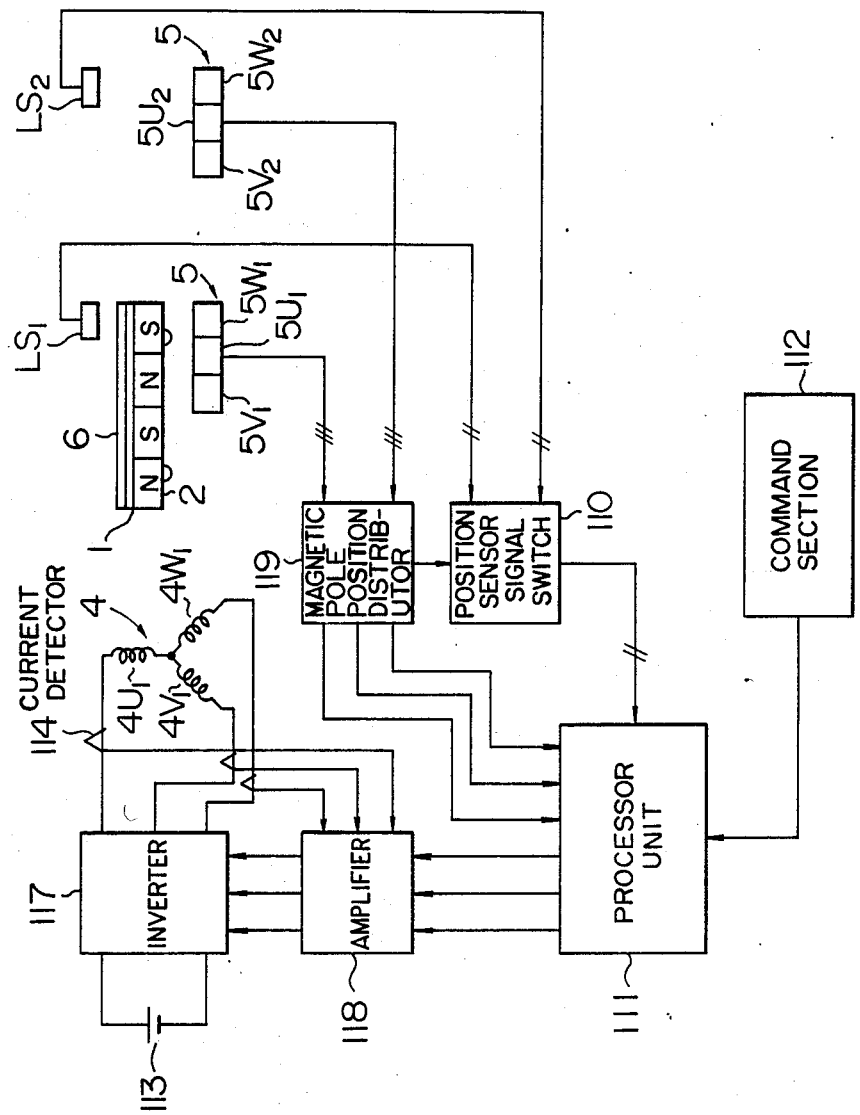
FIG. 20 is a block diagram of the control circuit thereof.

FIG. 20 shows a block diagram of the control circuit, with reference to which explanation will be made of the operation of the system having the configuration mentioned above.

Coils 4 including $4U_1$, $4V_1$, $4W_1$ for driving the rotor 1 are connected to an inverter 117, and a power supply for driving the inverter 117 is connected to a DC power supply 113. The inverter 117 is also connected with an amplifier 8 for controlling the duty cycle of the current supplied current for the inverter 117 in accordance with the difference between the signal of the current detector 14 and the current command signal of a processor unit 111.

The processor unit 111 detects the position of the magnetic pole from the magnet 2 provided on the rotor 1 by means of the magnetic pole position detectors $5V_1$, $5U_1$, $5W_1$, and prepares signals of each phase supplied to the coils 4 through a magnetic pole position distributor 9.

The magnetic pole position detector 5 also produces an "H" signal in the absence of magnetic fluxes from the magnet 2 or when the magnetic pole is S in polarity, while it produces an "L" signal only when the magnetic pole is N in polarity.

While the linear encoder magnetizer 6 mounted on the rotor 1 moves with the rotor 1, the output of the linear encoder sensor $LS_1$ takes a synchronous form such as sinusoidal wave according to the pattern magnetized on the linear encoder magnetizer 6. By shaping the waveform of this signal, output signals "H" and "L" are produced in pulse form alternately.

In the case shown in FIG. 20, the output of the linear encoder sensor $LS_2$ is unestablished in the state of "H" or "L", and does not take the form of any pulse.

When the rotor 1 is moved rightward in the drawing, however, the linear encoder sensors $LS_1$ and $LS_2$ are both covered by the linear encoder magnetizer 6 so that a pulse output signal is produced from both the linear encoder sensors $LS_1$ and $LS_2$. Since the N pole of the magnet 2 mounted on the rotor 1 comes to face the magnetic pole position detector $5V_2$, however, the output of the magnetic pole position detector $5V_2$ becomes "L", and the output of the linear encoder sensor $LS_2$ is selected by the position sensor signal switch 110 in accordance with the output of the magnetic pole position distributor 119, which output is applied to the processing unit 111.

A command section 112 gives an instruction on the current supplied to the coils 4, and the speed of the rotor 1 is proportional to the current supplied. This instruction is applied as a speed command to the processing unit 111.

The flow of operation is briefly explained above. More detailed explanation will be made with reference to FIGS. 21A to 23.

Figure 21A:
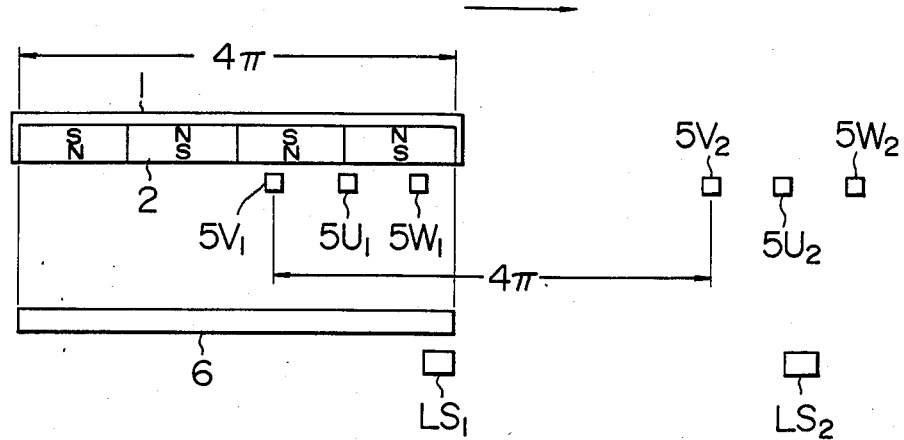
FIG. 21(A) shows a layout of the parts.

FIG. 21A shows the arrangement of the magnet 2 mounted on the rotor 1, the magnetic pole position detector 5, the linear encoder magnetizer 6 and the linear encoder sensor LS.

Figure 21B:
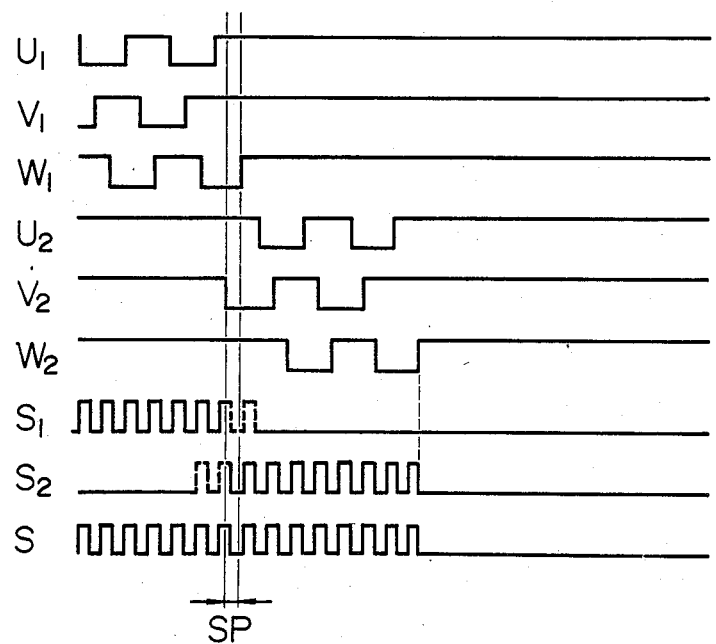
FIG. 21(B) shows waveforms switched.

FIG. 21B is a waveform diagram for switching operation, in which the signal waveforms of magnetic pole positions from $U_1$ to $W_2$ corresponds to the output signals of the magnetic pole position detectors $5U_1$ to $5W_2$ respectively. On the other hand, the signal waveforms of $S_1$ and $S_2$ correspond to the output signals of the linear encoder sensors $LS_1$ and $LS_2$. This signal waveform S is prepared by the logic sum of $S_1$ and $S_2$, or from the gate circuit of a selector or like.

If the rotor 1 located at the position shown in FIG. 21A, the magnetic pole position detector 5 becomes "L" at the N pole of the magnet 2, and "H" at the S pole thereof, so that $V_1$ and $W_1$ becomes "L" and "H" respectively at the positions where $U_1$ changes from "H" to "L".

Also, the magnetic pole position detectors $5V_2$, $5U_2$, $5W_2$ which are not affected by the magnetic field of the magnet 2 become "H", and with the rightward movement of the rotor 1, the magnetic pole position signals $U_1$ to $W_2$ undergo such changes as shown in the drawing.

The encoder output signals $S_1$ of the linear encoder sensor $LS_1$, on the other hand, is selected when the logic product of three corresponding magnetic pole position signals $U_1$ to $W_1$ produced from the magnetic pole position detectors $5V_1$ to $5W_1$ is in "L" state, while the output signal $S_2$ of the encoder is selected when the logic product of the magnetic pole position signals $U_2$ to $W_2$ are "L".

In the span SP indicated by a one-dot chain, however, since the logical multiplications of the magnetic pole position signals $U_1$ to $W_1$ and $U_2$ to $W_2$ are "L" levels, the encoder output signals $S_1$ and $S_2$ are prevented from being selected at the same time preferential selection of the output of the linear encoder sensor (the encoder output signal $S_2$ is previously selected in this case) located in the way of movement of the rotor 1 or by giving priority depending on the magnitude of the value n.

The foregoing description concerns the n value up to 2, and the same applied when n is larger than 2.

In the foregoing description, a high accuracy is achieved when the encoder output signal $S_1$ of the linear encoder sensor $LS_1$ is synchronous with the encoder output signal $S_2$ of the linear encoder sensor $LS_2$. If the phases of the pulse signals of these two encoder output signals $S_1$ and $S_2$ are to be synchronized in satisfactory manner, the problem is how to mount the linear encoder sensors with high accuracy.

Figure 22:
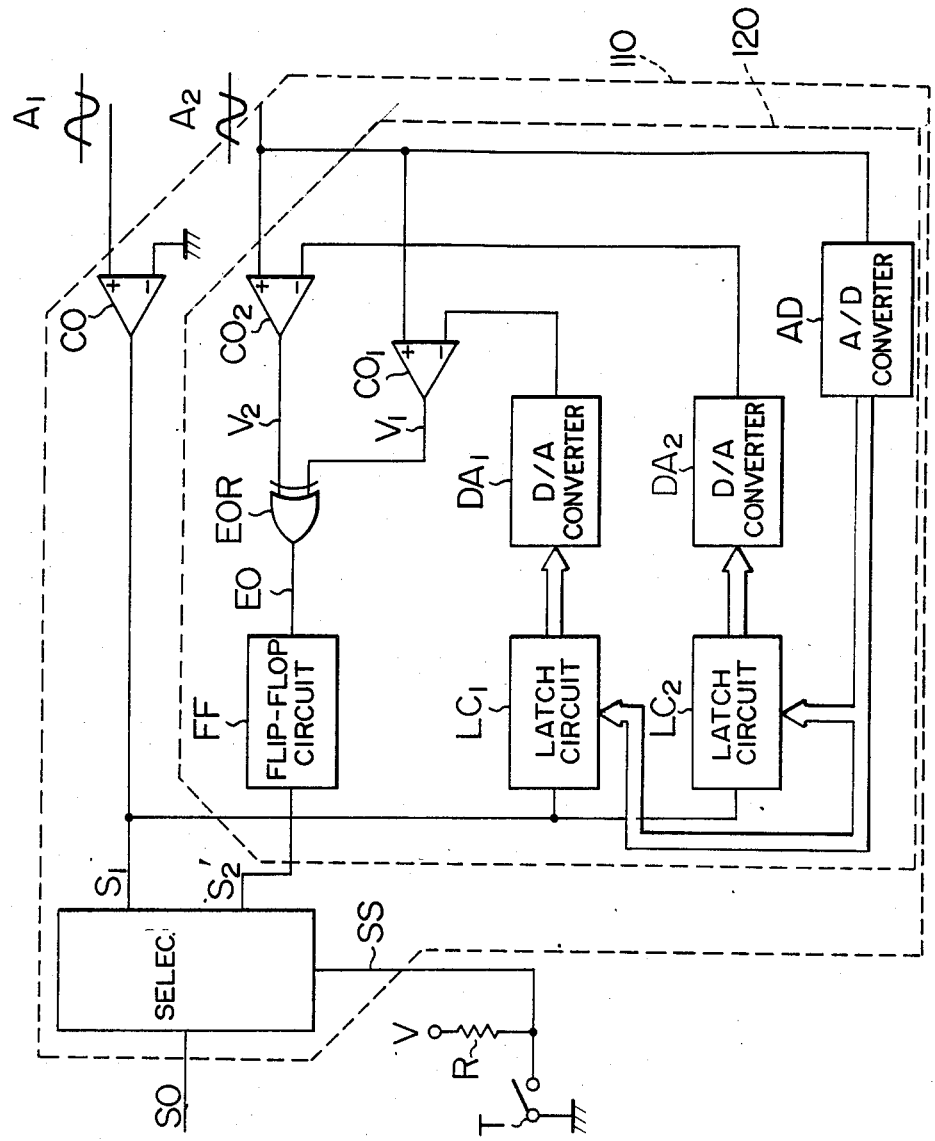
FIG. 22 is a block diagram of a position correction circuit thereof.

FIG. 22 is a circuit diagram which takes this problem point into consideration, and provides a counter measure by employing the system mentioned below. The position correcting circuit 120 is mounted in the position sensor signal switch 110, as shown in FIG. 22.

The configuration of such a system will be explained. An analog output signal $A_1$ of the linear encoder sensor $LS_1$ is connected to a comparator CO.

The output of this comparator CO is an "L" or "H" logic signal shaped in waveform and is connected as an input to a selector SELEC on the one hand and is connected as an clock input of latch circuits $LC_1$ and $LC_2$ on the other hand.

The analog output signal $A_2$ of the linear encoder sensor $LS_2$ is connected to the comparator $CO_2$, the comparator $CO_1$ and the A/D converter AD.

The output signal of the A/D converter AD is connected with latch circuits $LC_1$ and $LC_2$ for converting the analog output signal $A_2$ of the linear encoder sensor $LS_2$ into a digital signal.

The outputs of the latch circuis $LC_1$ and $LC_2$ are connected through the D/A converters $DA_1$ and $DA_2$ to the comparators $CO_1$ and $CO_2$ respectively. The outputs of the comparators $CO_1$ and $CO_2$ connected to the input of the EOR, the output of which is in turn connected as an input to a flip-flop circuit like a J/K flip-flop. The output of the flip-flop circuit FF is connected as the other input to the selector SELEC.

The select signal SS for selecting an input of the selector SELEC is produced by switching the pull-up resistor pulled up to the power supply V by a switch T.

The function of this select signal SS is equal to the logic product of the magnetic pole position signals $U_1$ to $W_1$ and $U_2$ to $W_2$ produced from the magnetic position detector 5 mentioned above. The signal S, or $S_2$ is selected by this select signal SS, and the selected signal is produced as an output signal SO of the selector SELEC.

The operation of this circuit will be explained with reference to FIG. 23. The analog output signals $A_1$ and $A_2$ produced from the linear encoder sensors $LS_1$ and $LS_2$ take sinusoidal waveforms as shown. In the example shown, the analog output signal $A_2$ is delayed behind the signal $A_1$ by 90 /5, indicating that a mechanical position of the linear encoder sensor $LS_2$ is displaced from that of $LS_1$ and also the time when the linear encoder sensors are to be switched.

As mentioned above, $S_1$ and $S_2$ designate waveform-shaped output signals obtained from the shaping of the analog output of the liner encoder at the zero cross point. The signal $S_1$ corresponds to the output of the linear encoder sensor $LS_1$, and the signal $S_2$ to the output of the linear encoder sensor $LS_2$.

Actually, the signal output necessary when switching from the linear encoder sensor $LS_1$ to the linear encoder sensor $LS_2$ requires the correction of the phase displacement from the analog output signals $A_1$ and $A_2$ produced from the linear encoder sensor by the switching point P in the presence of a mechanical position displacement of the linear encoder sensor $LS_2$ against $LS_2$ as shown by the output signal SO.

The signal SO' shows the absence of phase correction. In this case, the amount of phase displacement is added at time "L" at the switching point P, thus causing an error with the actual position.

The phase correction will be explained below.

In the case where the analog output signal $A_2$ is generated in the linear encoder sensor $LS_2$, the voltage value of the analog output signal $A_2$ of the linear encoder sensor $LS_2$ is converted into a digital signal by use of the A/D converter AD shown in FIG. 22 at the leading and trailing edges of the waveform-shaped output signal $S_1$, so that the value of the trailing edge of the waveform-shaped output signal $S_1$ is stored in the latch circuit $LC_1$ and the value of the leading edge thereof in the latch circuit $LC_2$. At the same time, these values are used as reference values for the comparators (negative inputs in this case) connected with the analog output signal $A_2$ produced from the linear encoders through the D/A converters $DA_1$ and $DA_2$, thereby producing the output signals $V_1$ and $V_2$ shown in FIG. 23 at the output terminals of the comparators $CO_1$ and $CO_2$ respectively.

Figure 23:
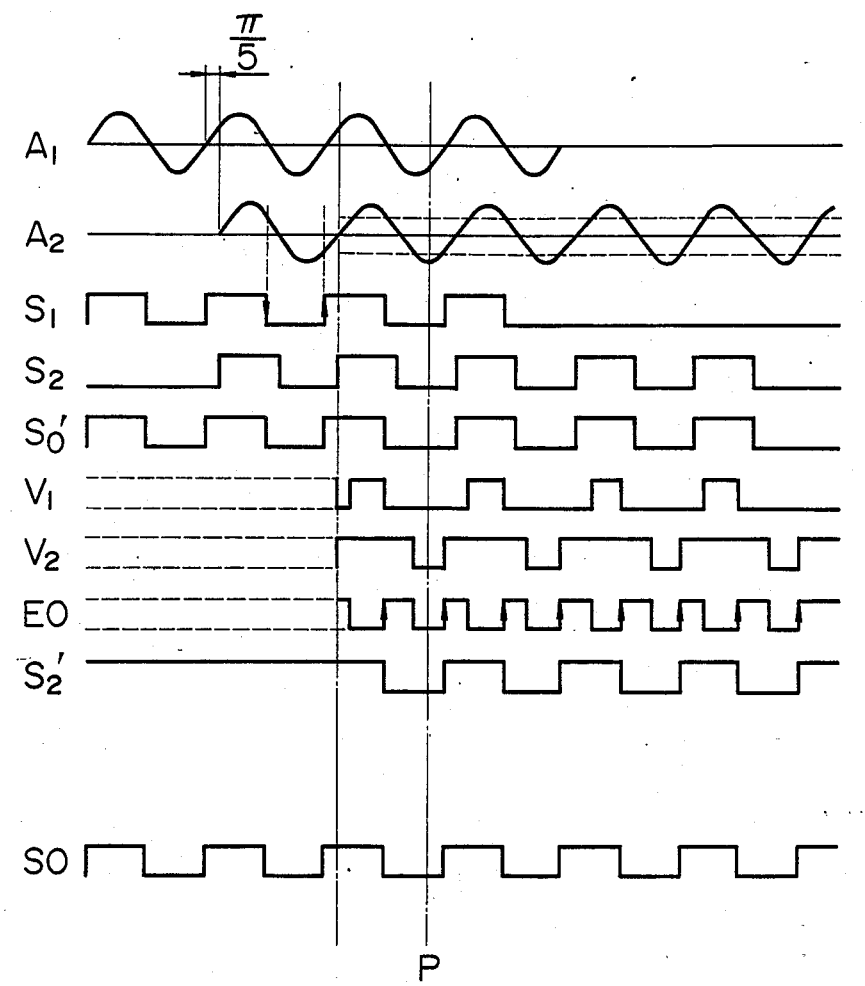
FIG. 23 is a signal timing chart for switching the encoder.

The outputs of the comparators $CO_1$ and $CO_2$ shown in FIG. 22 are applied through the EOR circuit EOR to produce an output signal from EO as shown in FIG. 23. The leading and trailing edges of this signal EO may be synchronized with the phase of the zero cross position of the analog output signal $A_1$ of the linear encoders.

Further, the output of the EOR circuit EOR is applied to the flip-flop circuit FF, and therefore the signal $S_2'$ shown in FIG. 23 is obtained by reversing the output of the flip-flop FF at the leading edge of the output EO of the EOR circuit.

By the above-mentioned operation, the input signals $S_1$ and $S_2'$ of the selector circuit SELEC are switched by the select signal SS, and a signal with the position thereof corrected is obtained even when there is a mechanical position displacement of the linear encoder sensor $LS_2$ at the switching point P.

As described above, according to the present invention, there is provided a linear motor of m phases (m: Integer) comprising n sets of coils, teeth and magnetic pole position detectors and linear encoders for correcting the mechanical position displacement which occurs at the time of mounting the linear encoder sensor, thus facilitating the switching operation. In this way, an infinite length of liner encoder can be configured with high accuracy.

According to the present invention, there is also provided a linear motor with high and low thrust with a simplified construction of the magnetic poles making up a rotor and with a reduced weight of the rotor. Since the optimum current pattern is supplied in accordance with an induced voltage, the optimum thrust is generated for an improved efficiency and improved controllability.

According to the present invention, a linear encoder for long-distance application is constructed with high accuracy by using a single short linear encoder magnetizer and a plurality of sensors and switching the output signal of the position sensor by means of the signal of the magnetic pole position sensor and mounting the phase correcting circuit 120 on the signal switch 110, and at the same time, the position thereof is detected with high accuracy.

We claim:

1. A linear motor comprising:
    a first magnetic pole including a plurality of first magnetic pole teeth of magnetic material having protruded and recessed parts extending in a longitudinal direction, each first magnetic pole tooth having a predetermined longitudinal length; and
    a second magnetic pole including a yoke, a plurality of second magnetic pole teeth of magnetic material having protruded and recessed parts, a coil assembly having a plurality of coils, a respective coil being wound on a respective one of said second magnetic pole teeth, and permanent magnets, said yoke and said second magnetic pole teeth being opposed to said first magnetic pole teeth with slight gaps, a relative position of said first and said second magnetic pole teeth in a longitudinal direction being changeable, a longitudinal length of said protruded and recessed parts of said first magnetic pole and said protruded parts of said second magnetic pole being substantially equal to each other, a longitudinal length of said recessed parts of said second magnetic pole being substantially one-third of the longitudinal length of said protruded parts of said first magnetic pole, and a number of said protruded parts of said first magnetic pole being a multiple of two.

2. A linear motor according to claim 1, wherein said first magnetic pole is a rotor and said second magnetic pole is a stator.

3. A linear motor according to claim 2, wherein said rotor is constructed only of a magnetic material such as uneven iron core.

4. A linear motor comprising:
a first magnetic pole including a plurality of first magnetic pole teeth of magnetic material having protruded and recessed parts extending in a longitudinal direction, each first magnetic pole tooth having a predetermined longitudinal direction; and
a second magnetic pole including a yoke, a plurality of second magnetic pole teeth of magnetic material having protruded and recessed parts, a coil assembly having a plurality of coils, a respective coil being wound on a respective one of said second magnetic pole teeth, and permanent magnets, said yoke and said second magnetic pole teeth being opposed to said first magnetic pole teeth with slight gaps, a relative position of said first and said second magnetic pole teeth in a longitudinal direction being changeable, a pitch P2 between said protruded parts of said second magnetic pole satisfying a following formula, $$\mathrm{Sin}\ (\pi/m) = |\sin[(P_2/P_3) \times 2\pi]|$$

where $P_3$ is a pitch between said protruded parts of said first magnetic pole, and m (an integer of at least 2) is a number of phases of said coils wound on said second magnetic pole, and a number of said protruded parts of said first magnetic pole is a multiple of two.

5. A linear motor according to claim 4, wherein said gaps are arranged in series in a moving direction of said first or second magnetic pole to form a magnetic circuit composed of said permanent magnet, said yoke, said first magnetic pole, and said second magnetic pole teeth of said second magnetic pole.

6. A linear motor according to claim 1, wherein a trapezoidal current having a same phase of a voltage induced in each of said coils flows through each of said coils when a waveform of said induced voltage is stepwise and one of said first and second magnetic poles is driven.

7. A linear motor according to claim 4, wherein a trapezoidal current having a same phase of a voltage induced in each of said coils flows through each of said coils when a waveform of said induced voltage is stepwise and one of said first and second magnetic poles is driven.

8. A linear motor according to claim 1, wherein a stepwise current having a same phase of voltage induced in each of said coils flows through each of said coils when a waveform of said induced voltage is trapezoidal and one of said first and second magnetic poles is driven.

9. A linear motor according to claim 4, wherein a stepwise current having a same phase of voltage induced in each of said coils flows through each of said coils when a waveform of said induced voltage is trapezoidal and one of said first and second magnetic poles is driven.

10. A method of detecting the position of a linear motor comprising a plurality of position sensors divided and arranged on a stator side in a longitudinal direction for detecting the position of a rotor and being sequentially operated by movement of said rotor, a plurality of magnetic pole position sensors divided and arranged on said stator side in a longitudinal direction for detecting the position of the magnetic pole of said rotor and being sequentially operated by the movement of said rotor, a magnetic pole position distributor, and a position sensor signal switch, wherein the signals of said position sensors are sequentially selected by the signals of said magnetic pole position sensors which are moving.

11. A method according to claim 10, wherein a position correcting circuit is mounted in said position sensor signal switch.

* * * * *